United States Patent [19]

Güttinger

[11] Patent Number: 5,180,336
[45] Date of Patent: Jan. 19, 1993

[54] OLDHAM COUPLING

[75] Inventor: Kurt Güttinger, Murten, Switzerland

[73] Assignee: Gutag Innovations AG, Murten, Switzerland

[21] Appl. No.: 642,699

[22] Filed: Jan. 15, 1991

Related U.S. Application Data

[63] Continuation of Ser. No. 409,326, Sep. 19, 1989, abandoned.

[30] Foreign Application Priority Data

Sep. 20, 1988 [CH] Switzerland .................. 03491/88

[51] Int. Cl.$^5$ ................................................ F16D 3/04
[52] U.S. Cl. ................................... 464/102; 464/147
[58] Field of Search ............... 464/102, 104, 106, 147

[56] References Cited

U.S. PATENT DOCUMENTS

| | | | |
|---|---|---|---|
| 481,780 | 8/1892 | Brown | 464/102 |
| 1,171,347 | 2/1916 | Morse | 464/102 X |
| 3,560,119 | 2/1971 | Busch et al. | |
| 3,989,422 | 11/1976 | Güttinger | |
| 4,108,606 | 8/1978 | Wingard | 464/104 X |
| 4,121,438 | 10/1978 | McCullough | 464/102 |
| 4,325,683 | 4/1982 | Miyazawa | 464/104 X |
| 4,437,820 | 3/1984 | Terauchi et al. | |
| 4,606,711 | 8/1986 | Mitsui et al. | |
| 4,611,373 | 9/1986 | Hazebrook | 464/145 X |
| 4,655,696 | 7/1987 | Utter | 464/102 X |
| 4,789,315 | 12/1988 | Guettinger | |
| 4,941,861 | 7/1990 | Painter | 464/102 |

FOREIGN PATENT DOCUMENTS

| | | |
|---|---|---|
| 177654 | 8/1905 | Fed. Rep. of Germany . |
| 60-159389 | 8/1985 | Japan .................. 464/102 |
| 60-159390 | 8/1985 | Japan .................. 464/102 |

Primary Examiner—Daniel P. Stodola
Assistant Examiner—William G. Battista, Jr.
Attorney, Agent, or Firm—Burns, Doane, Swecker & Mathis

[57] ABSTRACT

An Oldham coupling for connecting two parallel structural parts such as shafts is disclosed wherein an intermediate ring is freely movable between the hubs of the two structural parts intended for connection. The ring carries on its flat sides two lands located at 90° relative to each other and the lands engage corresponding grooves in the hubs. The lands are convex at their friction surfaces and the load bearing walls of the grooves are correspondingly concave to receive the lands. An Oldham coupling of this type is particularly suitable as both a guiding and a rotation inhibiting mechanism for the revolving displacement body of a rotating piston machine of the displacer type.

2 Claims, 2 Drawing Sheets

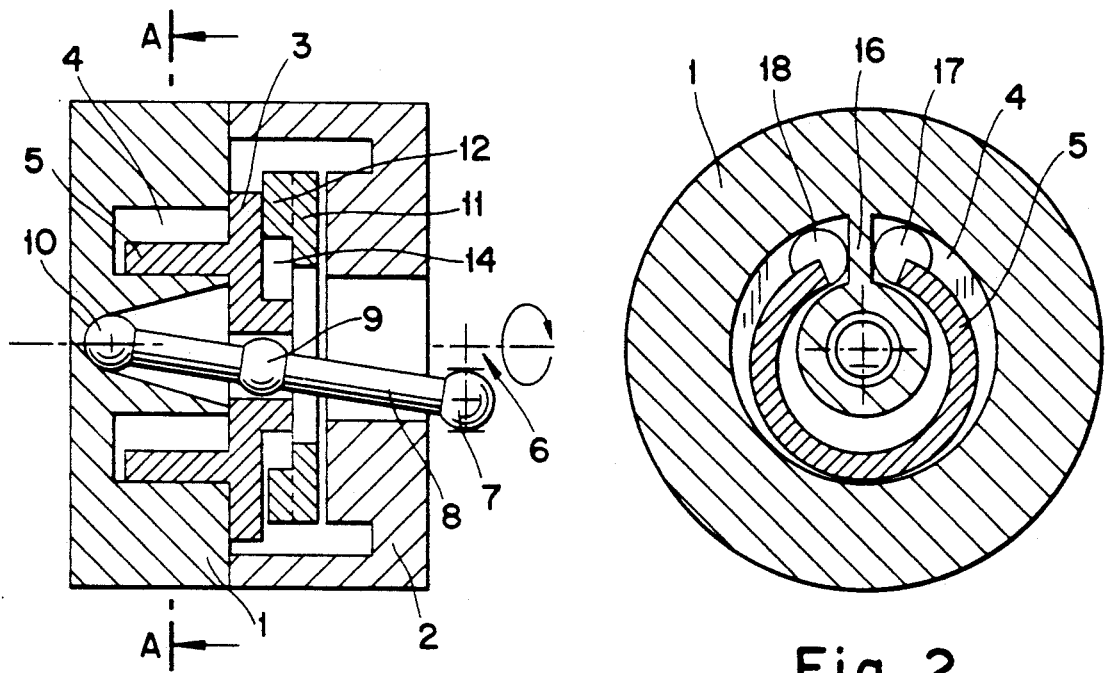
Fig. 1
Fig. 2
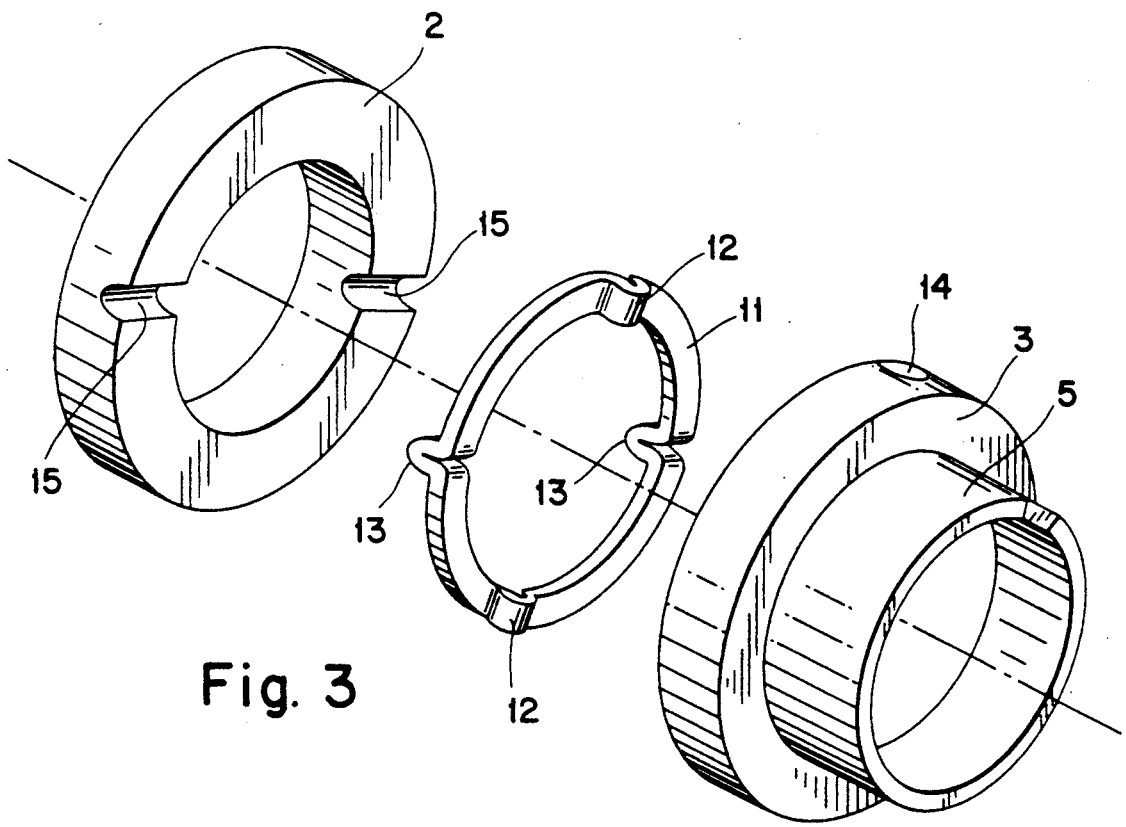
Fig. 3

OLDHAM COUPLING

This application is a continuation of application Ser. No. 07/409,326, filed Sep. 19, 1989, now abandoned.

BACKGROUND OF THE INVENTION

1. Field of the Invention

The invention relates to an Oldham coupling to connect two parallel structural parts, for example shafts, wherein the intermediate ring freely moving between the hubs of the two structural parts to be connected carries on its flat sides two lands located at 90° relative to each other, said lands engaging corresponding grooves in the hubs. Oldham couplings are especially suitable as the coupling element for a device revolving on a path, in which two structural parts must be maintained in a predetermined angular relationships relative to each other. This is the case for example in apparatuses, such as rotating piston positive displacement machines.

2. Discussion of Related Art

Oldham couplings of the above-mentioned type are disclosed in EP 10930 Bl, U.S. Pat. No. 4,437,820 and DE 27 35 664. All of those disclosures relate to displacement machines for compressible media. They each comprise a working chamber defined by helical circumferential walls extending vertically from a side wall and leading from an inlet located outside the helices to an outlet inside the helices. They further contain a helical displacement body extending into the working chamber. The latter is supported rotatingly without rotation relative to the working chamber. Its center is eccentrically offset relative to the center of the circumferential walls, so that the displacement body is always in contact with both the outer and the inner circumferential wall of the working chamber along at least one advancing line. During the operation of the machine therefore a plurality of sickle shaped working spaces are enclosed. The working spaces move from the inlet to the outlet through the working chamber. Depending on the angle of contact of the helix, the volume of the working medium conveyed may be gradually reduced with a corresponding increase of the pressure of said medium.

In the known machines, the relative rotating motion is always transmitted by a highly stressed and thus expensive ball bearing. Furthermore, no measure is provided to insure the operation without clearance of the machine in case of the wear of the material of the wobble rod or rods. In all of those known machines, Oldham (cross-keyed) couplings are the rotation inhibiting means for the displacer. Radial displacement is limited by the contact of the helical ribs with the walls of the working chambers. This limitation theoretically corresponds to a circle, in this case a translational circle. The displacer, which does not rotate relative to the working chamber, must be guided by means of the Oldham coupling in a manner such that the parallel guidance permits a larger diameter than that corresponding to the diameter of the translation circle. The reason for this is the fact that the radial displacement of the displacer is to be limited by the rib/chamber wall combination and not by the guiding Oldham coupling. Using this rule, the dimensions of the Oldham coupling are readily determined.

It is generally believed that such Oldham couplings are not suitable for the transmission of large torques and high rpm in view of the bending fatigue exposure and frictional losses. As in operation the lands are constantly sliding back and forth in the grooves, the Oldham coupling should be running in an oil bath in order to reduce friction losses and wear. Thus for example, the lands of the Oldham coupling according to DE 27 35 664 include, although they consist of a self-lubricating material such as polyimide, regular oil grooves in their lateral sliding surfaces, intended to promote the development of an effective and efficient oil film around the lands.

In all of the known Oldham couplings the lands consist of rectangular blocks engaging correspondingly shaped grooves. The objections to the use of Oldham couplings is understandable to the extent that the lateral clearance in the grooves must be minimal for uniform guidance. However, this necessarily leads to frictional surfaces which tend to wear. In addition, dirt may penetrate the coupling and jam the parts, which interferes with the operation of the coupling.

SUMMARY OF THE INVENTION

It is therefore the object of the invention to develop an Oldham coupling which remains free of clearances even in the case of progressive abrasion of material due to wear.

According to the invention, this object is attained in that the lands are convex on their frictional surfaces, that the load bearing walls of the grooves to receive the lands are correspondingly concave and that the bottom of the grooves are recessed to prevent contact with the land.

The advantage of the invention is to be seen in that the novel configuration provides an Oldham coupling that is self-adjusting in operation and nearly free of maintenance.

It is especially convenient to design the friction surfaces of the lands and the load bearing surfaces of the grooves with a circular cross section. This insures that the bearing zone is always sufficiently large, independently of the magnitude of the axial and horizontal forces acting on the coupling.

BRIEF DESCRIPTION OF THE DRAWINGS

The drawings illustrate an example of embodiment and an application example of the invention schematically. In the drawings:

FIG. 1 is a longitudinal cross section through a pump with a revolving piston,

FIG. 2 is a cross section through the pump on the line A—A in FIG. 1,

FIG. 3 is a perspective view of an Oldham coupling to be mounted,

In the severely simplified view of the pump according to FIGS. 1 and 2, only the parts that are essential for the comprehension of the invention are shown. In the several figures identical parts are provided with identical reference symbols.

DETAILED DESCRIPTION OF THE PREFERRED EMBODIMENTS

Figure 4A:
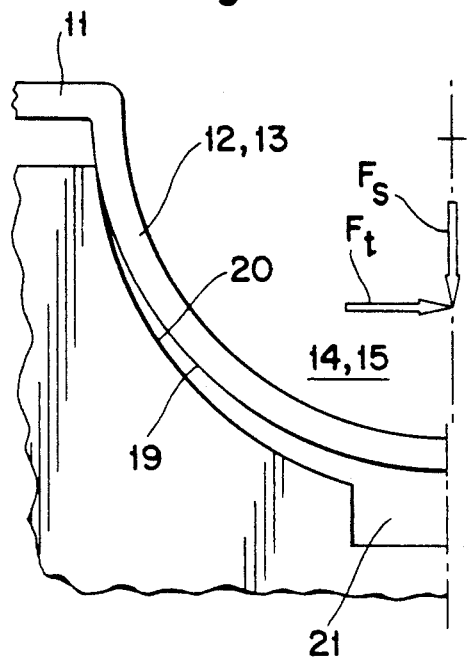
FIGS. 4a and 4b are views of the geometry of the frictional parts of an Oldham coupling.

The pump according to FIGS. 1 and 2 essentially consists of two housings halves 1, 2, connected in a suitable manner with each other, and a displacer inserted in between. In the left half of the housing 1 an annular working chamber 4 is located. It is divided by a web 16 extending over the entire depth of the chamber. On either side of the web, in the rear wall of the half 1 of the housing, the inlet 17 and the outlet 18 for the working medium to be transported, are located. This working chamber is engaged by the annular rib 5 of the displacer 3. The ring is slit at the location opposite to the web 16. In operation, the displacer performs an orbital motion.

For this, a wobble rod drive is provided. A crank drive 6, not shown in detail, is equipped on the crank side with a spherical articulated socket, in which the spherical end 7 of a wobble rod 8 is supported rotatingly. By means of a spherical collar 9, the wobble rod is supported practically without radial clearance in the hub of the displacer 3 in a rotating and pivoting manner. On its side engaging the left half 1 of the housing the wobble rod is also supported by means of a spherical end 10.

During its revolving motion the displacer is in constant contact with both the inner and the outer circumferential walls of the working chamber. By the displacement of its position, the working medium is suctioned in through the inlet 17 into the chamber 4 and discharged from the machine through the outlet 18.

An Oldham coupling is provided for the guidance of the displacer without rotation. It essentially comprises an intermediate ring 11, provided on its flat sides with lands 12, 13. In the example shown, the lands 12 facing the displacer 3 may be displaced relative to the displacer on a common vertical axis. The lands 12 engage the correspondingly shaped grooves 14 in the displacer 3. The lands 13, which are offset by 90° with respect to the lands 12, i.e., horizontal in this case and thus not shown in FIG. 1, are facing the stationary right half 2 of the housing and may be displaced relative to it on a common horizontal axis. The lands 13 slide in appropriately configured horizontal grooves 15 in the frontal side of the housing half 2.

The principle may be seen in FIG. 3, in which the hubs of the structural parts to be coupled are shown as simple rings. With reference to the pump shown in FIG. 1, the reference number 2 is used for the stationary housing part and the reference numbers 3 and 5 for the revolving displacer.

Figure 4B:
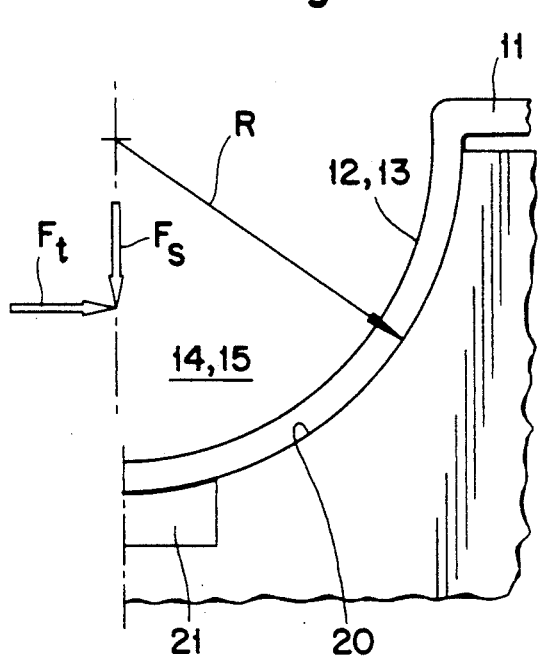

The proper geometry of the parts sliding on each other is shown in FIGS. 4a and 4b. The semi-cylindrical frictional surface 19 of the lands 12, 13 should coincide with the semi-cylindrical curvature of the wall of the grooves 14, 15. A semi-cylindrical shape with a radius R is chosen for both parts. FIG. 4b shows an inserted coupling in which the wall of the grooves 14, 15 carries over the entire available surface and is thus clearance free. FIG. 4a however shows a coupling prior to extended use wherein because of manufacturing inaccuracies or even an intentional difference in the radii of "ball and socket", the land 12, 13 is not in contact with the groove 14, 15 over the entire surface of the wall of the grooves. The land 12, 13, however, remains carried over a considerable section on the upper edge of the groove 14, 15. Consequently, the coupling in FIG. 4a is still without clearance. It may also be seen that jamming as a result of material wear after extended use is not possible. The coupling is absolutely without clearance, regardless of the mutual position of the land and the groove.

The bottom 21 of the groove 14, 15 is offset rearward so that even with a complete insertion of the land 12, 13 into the groove there is no contact with the bottom. The recessed bottom of the groove prevents in any case the location of the load bearing zone in the head of the land, i.e., in the bottom of the groove. In such a case, as shown by experiments, a lateral clearance may develop between the wall and the lands.

The prevailing forces include firstly the contact pressure $F_S$, which according to FIGS. 4a and 4b acts in the vertical direction, i.e., in the axial direction of the coupling. This force usually corresponds to a spring force. Therefore in view of the minimal spring path, the force $F_S$ is usually constant to some extent. Secondly, horizontal forces $F_t$ acts on the vertical lands 12, 13, which forces $F_t$ are variable relative to size and direction. Both of these are functions of the position and magnitude of the frictional forces between the annular displacer 3 and the wall of the working chamber 4.

The normal force acting on the load bearing wall 20 of the grooves is the resultant of the forces $F_S$ and $F_t$. It is therefore seen that the load along the bearing zone is not uniform. If $F_t$ is larger than $F_S$, the load in the upper segment section of the groove is higher than in the lower segment. It may further occur that upon a reversal of the force ratios the center vector of the reaction force slowly turns downward. Any migration of the force vector into the groove bottom must be prevented. The solution is the recessed groove bottom.

It is further seen in FIGS. 4a and 4b that the intermediate ring 11 and the lands 12, 13 are of a single piece. It may consist of a deep-drawn workpiece, which has a favorable effect on production costs.

Figure 5:
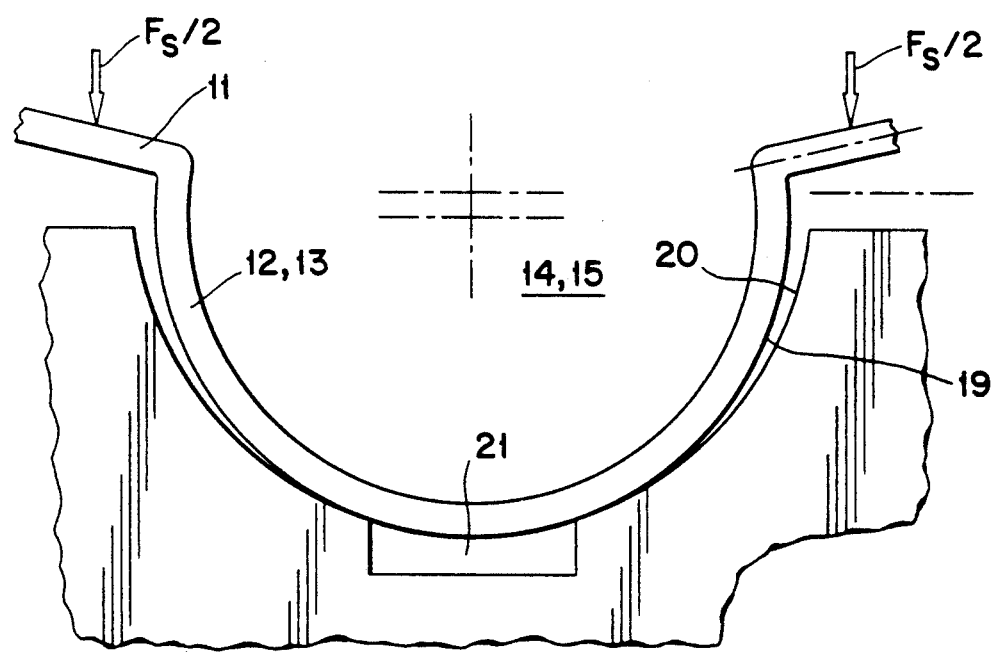
FIG. 5 is a view of an unstressed coupling with a prestressed intermediate ring.

In the afore-described application in positive displacement machines it ma be advantageous to make the integral workpiece of a corrosion resistant spring steel. As shown in FIG. 5, it is then possible to prestress the intermediate ring so that abutment in the grooves without clearance is assured under all operating conditions. In addition, the element also applies the axial force to the displacer 3, that is necessary to maintain the sealing action between the frontal sides of the rib 5 of the displacer 3 and the working chamber 4.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. An Oldham coupling to connect parallel structural parts, comprising:
    an intermediate ring having planar surfaces and being freely movable between planar surfaces of hubs of said structural parts to be connected;
    lands located at 90 degrees relative to each other on the planar surfaces of the intermediate ring, said lands having friction surfaces;
    said planar surfaces of said hubs having grooves with load bearing walls, said grooves corresponding to said lands;
    said lands adapted to slidably engage the corresponding grooves of the hubs;
    said lands being semi-cylindrical on their friction surfaces and the load bearing walls of the grooves being correspondingly semi-cylindrical to hold said lands for slidable engagement therein, the central axis of the semi-cylindrical friction surfaces extending radially of the intermediate ring; and said grooves each having a recess for reducing frictional wear between said lands and said grooves during operation of said coupling, said recess disposed at the bottom of each of said grooves and extending axially of the groove such that contact between the grooves and the lands is substantially prevented at the bottom of said semi-cylindrical grooves.

2. The Oldham coupling according to claim 1, wherein the intermediate ring is an integral prestressed part together with the lands made of spring steel.

* * * * *